(No Model.)

S. T. WILLIAMS.
Pipe Coupling.

No. 241,465. Patented May 10, 1881.

Witnesses:
Geo. W. Hiatt
Edw. Payson

Inventor:
Samuel T. Williams
Per Edw. E. Quimby
Atty.

UNITED STATES PATENT OFFICE.

SAMUEL T. WILLIAMS, OF RED BANK, NEW JERSEY, ASSIGNOR TO HIMSELF AND FRANZ O. MATTHIESSEN, OF IRVINGTON, NEW YORK.

PIPE-COUPLING.

SPECIFICATION forming part of Letters Patent No. 241,465, dated May 10, 1881.

Application filed August 20, 1880. (No model.)

*To all whom it may concern:*

Be it known that I, SAMUEL T. WILLIAMS, of Red Bank, Monmouth county, New Jersey, have invented certain Improvements in Pliable Metallic Pipe-Coupling, of which the following is a specification.

My improvement is especially designed to be used for coupling the sections of a pipe which is to be deposited upon the bed of a river, or upon some other curved or irregular surface; and my invention consists of a coupling in the form of a cylinder of any desired length, made of lead, and cast or otherwise formed with one or more transverse circumferential corrugations, and provided at its ends with suitable flanges for connection with the flanges, respectively, of the iron sections which it is designed to unite. An iron pipe the sections of which are thus coupled has longitudinally both contractability and extensibility, and hence, when lowered upon the bed of a river, bends at the couplings, and accomodates itself to the contour of the surface upon which it rests.

Figure 1:
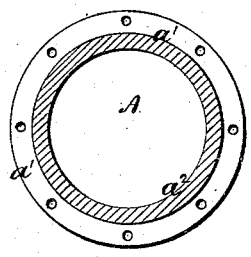
Figure 2:
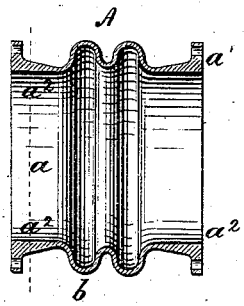

The accompanying drawings, representing my invention, are as follows:

Figure 1 is a longitudinal section of one of my couplings formed with two transverse circumferential corrugations. Fig. 2 is a transverse section of the same; and Fig. 3 is an elevation of a pipe composed of several iron sections united by my couplings, and represented as resting upon an uneven surface.

My coupling A is a short metallic cylinder, $a$, having an outward flange, $a'$, at each end, and having one or more transverse circumferential corrugations, $b$. I prefer to make my coupling of lead, which can be done by casting it in a suitable mold. The flanges $a'$ of the coupling are secured to the flanges $c$ of the iron sections C by the usual bolts, $c'$, an ordinary packing-ring, $c^2$, being introduced between them. Iron washers $c^3$, through which the bolts pass, prevent the impact of the bolt-heads upon the lead flanges. The flanges and the end portions, $a^2$, of the coupling-cylinder immediately adjoining the flanges are made thicker than the middle portion of the cylinder, in order to give the joints the necessary strength to resist longitudinal tension when the coupled pipe is bent upon its longitudinal axis.

Figure 3:
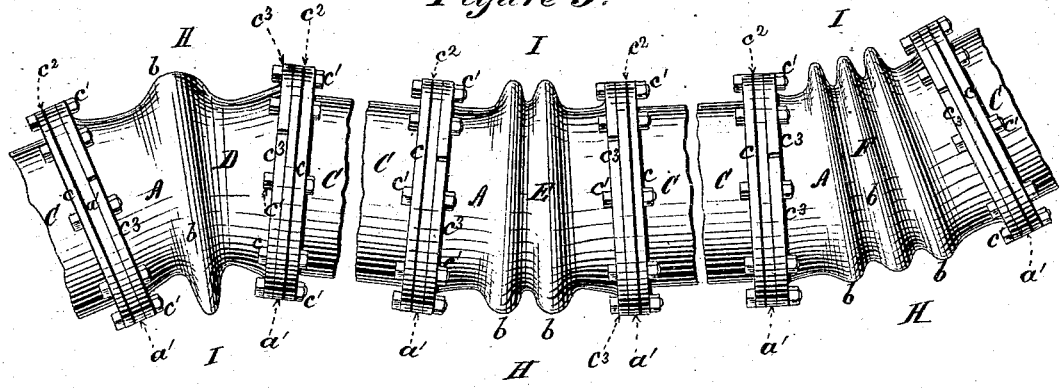

The operation of my improvement is illustrated in Fig. 3, in which the middle parts of the iron sections of pipe are represented as broken out, in order to exhibit a larger number of my couplings.

It will of course be understood that the thickness of the shell of the coupling will be determined with reference to the amount of internal pressure to be sustained, and that the length of the iron sections, and consequently the frequency with which the pliable couplings are introduced, will depend upon the length of the curves in the surface upon which the pipe is to rest.

In cases where the internal pressure is small and the shell of the coupling is comparatively thin, it may be sufficient to have only a single circumferential corrugation, as shown in the coupling D, Fig. 3. When a thicker shell is used there may be two or three or more circumferential corrugations in the couplings, as shown respectively in the couplings E and F, Fig. 3.

The couplings with multiple corrugations are of especial usefulness where some portion of the pipe is to rest upon a bed of fugitive character—as, for example, a quicksand or a light earth subject to being washed out from beneath the pipe by currents of water. For such cases the corrugations may be so multiplied as to increase the extensibility of the pipe to any required extent, and thus enable the pipe to settle to its final bearing without rupturing the joints. In bending into a curve the parts of the corrugations upon the outer side, H, of the couplings are stretched out, and those upon the inner side, I, are folded closer together, substantially as shown in Fig. 3.

I am not the original inventor of a circumferentially-corrugated coupling-pipe made of a pliable metal, and therefore do not claim such a structure broadly; but What I do claim as my invention is—

1. An extensible pipe composed of sections made of an inflexible material, and united respectively, by means of bolted flanged joints, to interposed sections made of lead, and circumferentially corrugated, substantially as described.

2. A hollow cylinder or pipe coupling joint, of lead, having its shell formed in parallel circumferential corrugations, and provided at its ends with outwardly-projecting flanges, as and for the purpose set forth.

3. The herein-described pliable metallic pipe, flanged at its ends and circumferentially corrugated, and having its end portions, $a^2$, adjoining the flanges made thicker than the middle portion of the pipe, as and for the purpose set forth.

SAMUEL T. WILLIAMS.

Witnesses:
EDWD. PAYSON,
MARY L. ADAMS.